(12) United States Patent
Biran et al.

(10) Patent No.: US 8,874,457 B2
(45) Date of Patent: Oct. 28, 2014

(54) CONCURRENT SCHEDULING OF PLAN OPERATIONS IN A VIRTUALIZED COMPUTING ENVIRONMENT

(75) Inventors: Ofer Biran, Haifa (IL); Erez Hadad, Nahariya (IL); Evgeny Hazanovich, Haifa (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 12/947,844

(22) Filed: Nov. 17, 2010

(65) Prior Publication Data

US 2012/0123825 A1    May 17, 2012

(51) Int. Cl.
*G06Q 10/00* (2012.01)
*G06Q 10/06* (2012.01)

(52) U.S. Cl.
CPC .................................. *G06Q 10/0637* (2013.01)
USPC ............... 705/7.12; 709/223; 709/226; 718/1

(58) Field of Classification Search
USPC ........................ 705/7.12; 709/223, 226; 718/1
See application file for complete search history.

(56) References Cited

U.S. PATENT DOCUMENTS

| | | | | |
|---|---|---|---|---|
| 4,123,795 A | * | 10/1978 | Dean et al. ..................... | 718/103 |
| 4,584,644 A | * | 4/1986 | Larner ........................... | 710/260 |
| 5,179,702 A | * | 1/1993 | Spix et al. ...................... | 718/102 |
| 5,555,444 A | * | 9/1996 | Diekelman et al. ........... | 455/12.1 |
| 5,812,811 A | * | 9/1998 | Dubey et al. ................... | 712/216 |
| 6,195,676 B1 | * | 2/2001 | Spix et al. ...................... | 718/107 |
| 6,415,196 B1 | * | 7/2002 | Crampton et al. ............. | 700/100 |
| 6,665,740 B1 | * | 12/2003 | Mason et al. ..................... | 710/6 |
| 7,152,157 B2 | * | 12/2006 | Murphy et al. ................ | 713/100 |
| 7,162,318 B1 | * | 1/2007 | Brearley et al. ................. | 700/97 |
| 7,191,329 B2 | * | 3/2007 | Murphy ......................... | 713/100 |
| 7,257,811 B2 | * | 8/2007 | Hunt et al. ......................... | 718/1 |
| 7,409,656 B1 | * | 8/2008 | Ruehl ........................... | 716/112 |
| 7,594,227 B2 | * | 9/2009 | Inchingolo et al. ........... | 718/100 |
| 7,712,080 B2 | * | 5/2010 | Pan et al. ....................... | 717/119 |
| 7,730,486 B2 | * | 6/2010 | Herington ......................... | 718/1 |
| 7,802,248 B2 | * | 9/2010 | Broquere et al. ................. | 718/1 |
| 8,019,861 B2 | * | 9/2011 | Ginzton ......................... | 709/224 |
| 8,028,048 B2 | * | 9/2011 | Karve et al. ................... | 709/221 |
| 8,032,634 B1 | * | 10/2011 | Eppstein et al. .............. | 709/226 |
| 8,079,019 B2 | * | 12/2011 | Lindo et al. ................... | 717/129 |
| 8,095,906 B2 | * | 1/2012 | Betz et al. ..................... | 716/131 |

(Continued)

OTHER PUBLICATIONS

Johnson, Theodore et al., Short Communication: A concurrent dynamic task graph Parallel Computing, vol. 22, 1996.*

(Continued)

*Primary Examiner* — Scott L Jarrett
(74) *Attorney, Agent, or Firm* — Richard A. Wilhelm; James R. Nock

(57) ABSTRACT

Systems and methods for planning the execution of one or more plans in a virtualized computing environment are provided. In one embodiment, the method comprises computing an order for execution for one or more plans, and the corresponding operations in said one or more plans; validating whether a plan and the corresponding operations for the plan may be successfully executed, prior to executing the plan and the corresponding operations; executing the plan and the corresponding operations, in response to a successful validation; and aborting execution of the plan and the corresponding operations, in response to an unsuccessful validation, wherein the validating process takes into consideration impact of other plans that are previously validated and possible changes in the computing environment since time the plan was computed.

15 Claims, 16 Drawing Sheets

(56) References Cited

U.S. PATENT DOCUMENTS

| | | | |
|---|---|---|---|
| 8,103,770 B1* | 1/2012 | Masters | 709/225 |
| 8,112,527 B2* | 2/2012 | Kawato | 709/226 |
| 8,117,505 B2* | 2/2012 | Sridharan et al. | 714/47.2 |
| 8,225,325 B2* | 7/2012 | Munshi et al. | 718/104 |
| 8,225,326 B2* | 7/2012 | Petersen et al. | 718/106 |
| 8,245,202 B2* | 8/2012 | Miura | 717/138 |
| 8,249,904 B1* | 8/2012 | DeSantis et al. | 705/7.12 |
| 8,307,362 B1* | 11/2012 | Gong et al. | 718/1 |
| 8,321,862 B2* | 11/2012 | Swamy et al. | 718/1 |
| 8,434,077 B2* | 4/2013 | Chess et al. | 717/168 |
| 8,495,627 B2* | 7/2013 | Barsness et al. | 718/1 |
| 2004/0010437 A1* | 1/2004 | Kiran et al. | 705/8 |
| 2007/0050225 A1 | 3/2007 | Leslie | |
| 2008/0172673 A1* | 7/2008 | Naik | 718/104 |
| 2008/0294777 A1* | 11/2008 | Karve et al. | 709/226 |
| 2009/0007125 A1* | 1/2009 | Barsness et al. | 718/104 |
| 2009/0043991 A1* | 2/2009 | Guo et al. | 712/216 |
| 2009/0260012 A1 | 10/2009 | Borghetti et al. | |
| 2009/0265707 A1* | 10/2009 | Goodman et al. | 718/1 |
| 2010/0162248 A1* | 6/2010 | Plancarte et al. | 718/101 |
| 2011/0055484 A1* | 3/2011 | Eichenberger et al. | 711/125 |
| 2011/0321051 A1* | 12/2011 | Rastogi | 718/102 |
| 2012/0042311 A1 | 2/2012 | Biran et al. | |

OTHER PUBLICATIONS

Barli, Niko Demus, Designing NEKO: A Speculative Multithreading Chip Mutiprocessor The University of Tokyo, 2004.*

Beletsky, V. et al., Organization of a Parallel Virtual Machine IEEE, 1994.*

Sen, Alper, Predictive Runtime Verification of Multi-Processor SoCs in SystemC ACM, DAC'08, Jun. 8-13, 2008.*

Li, Tong et al., Pulse: A Dynamic Deadlock Detection Mechanism Using Speculative Execution 2005 USENIX Annual Technical Conference, 2005.*

Feldman, Anja et al., Optimal Online Scheduling of Parallel Jobs with Dependencies Carnegie Mellon University, Sep. 1992.*

Chen, Michael K. et al., TEST: A Tracer for Executing Specualtive Threads IEEE, Proceedings of CGO'03, Mar. 2003.*

Nocentino, Anthony et al., Toward Dependency-Aware Live Virtual Migration ACM, VTCS'09, Jun. 15, 2009.*

Pickett, Christopher J.F. et al., Speculative Multithreading in a Java Virtual Machine McGill University, Sable Research Group, Sable Technical Report Jan. 2005, Mar. 25, 2005.*

Zhao, Ming et al., Experimental Study of Virtual Machine Migration in Support of Reservation of Cluster Resources $2^{nd}$ International Workshop on Virtualization Technology in Distributed Computing, VTDC'07, Nov. 2007.*

Clark, Christopher et al., Live Migration of Virtual Machines USENIX Assocating, NSDI'05, $2^{nd}$ Symposium on Networked Systems Design & Implementation, 2005.*

Douglis, Fred et al., Transparent Process Migration: Design Alternatives and Sprite Implementation Software Practice and Experience, vol. 21, No. 8, Aug. 1991.*

Osman, Steven, et al., The Design and Implementation of Zap: A System for Migrating Computing Environments Proceedings of the $5^{th}$ Symposium on Operating Systems Design and Implementation, OSDI'02, Dec. 2002.*

VMware VMotion and CPU Compatibility—Information Guide VMware, Inc., 2008.*

Milojicic, Dejan S. et al., Process Migration ACM Computing Surveys, vol. 32, No. 3, Sep. 2000.*

Ma, Qian et al., Model-Base Depedency Management for Migrating Service Hosting Evironment 2007 IEEE International Confirerence on Services Computing, SCC'07, 2007.*

Cully, Brendan et al., Remus: High Availability via Asynchronous Virtual Machine Replication USENIX Association, NSDI,08, $5^{th}$ Usenix Symposium on Networked Systems Design and Implementation, 2008.*

Smith, David Justin, Fault Tolerance using Whole-Process Migration and Speculative Execution California Institue of Technology, Thesis, May 30, 2003.*

VMWare VirtualCenter—User's Manual—Version 1.4 WMWare, Inc., 2006.*

Ezpeleta et al., "A deadlock avoidance approach for nonsequential resource allocation systems", IEEE Transactions on Systems, Man and Cybernetics, Jan. 2004, pp. 93-101, vol. 34, Issue 1, © 2004 IEEE DOI: 10.1109/TSMCA.2003.820575.

Fontao, R.O., "A concurrent algorithm for avoiding deadlocks in multiprocess multiple resource systems", Proceedings of the third ACM symposium on Operating systems principles, Oct. 1971, pp. 72-79, © ACM, New York, NY, DOI: 10.1145/800212.806502.

Holt, R.C., "Comments on Prevention of System Deadlocks", Communications of the ACM, Jan. 1971, pp. 36-38, vol. 14, Issue 1, © ACM, New York, NY DOI: 10.1145/362452.362486.

Mell et al., "The NIST Definition of Cloud Computing", Recommendations of the National Institute of Standards and Technology, U.S. Department of Commerce, Special Publication 800-145, Sep. 2011, 7 Pages, Gaithersburg, MD.

Reveliotis et al., "Polynomial-complexity deadlock avoidance policies for sequential resource allocation systems", IEEE Transactions on Automatic Control, Oct. 1997, pp. 1344-1357, vol. 42, Issue 10, © 1997 IEEE DOI: 10.1109/9.633824.

Sussman et al., "The Bancomat Problem: An Example of Resource Allocation in a Partitionable Asynchronous System", IBM TJ Watson Research Center, New York and Department of Computer Science and Engineering, California, 27 Pages.

* cited by examiner

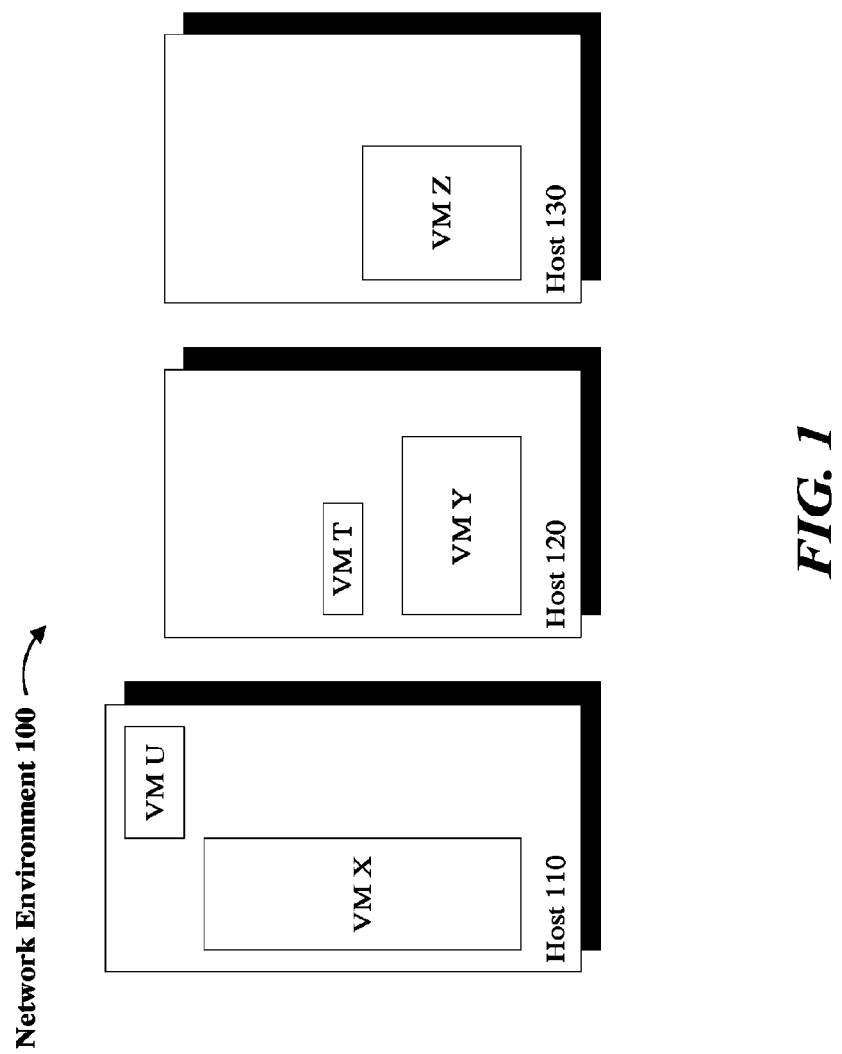

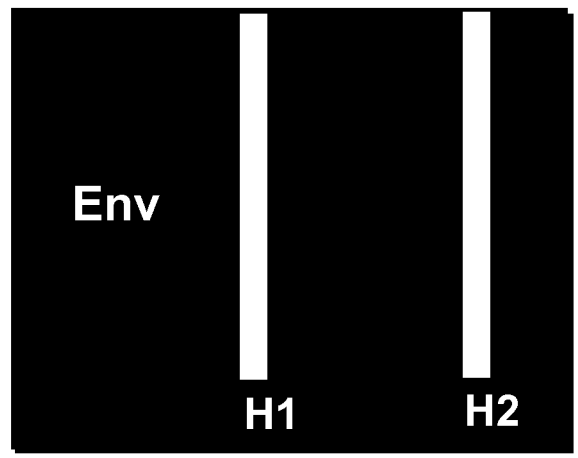
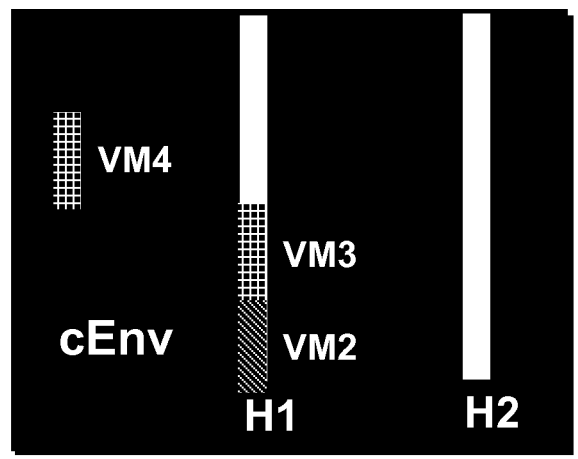
*FIG. 3C(i)*

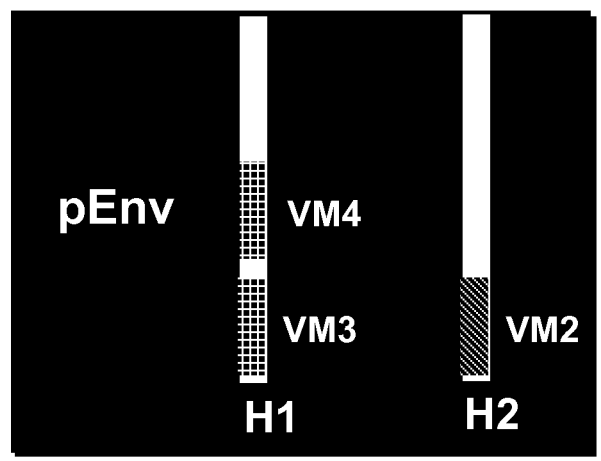
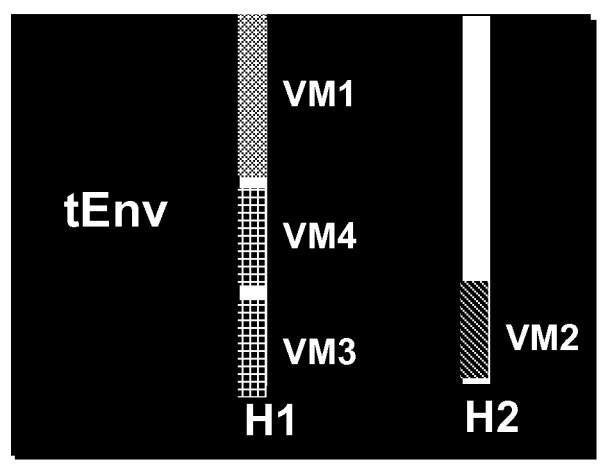
FIG. 3C(ii)

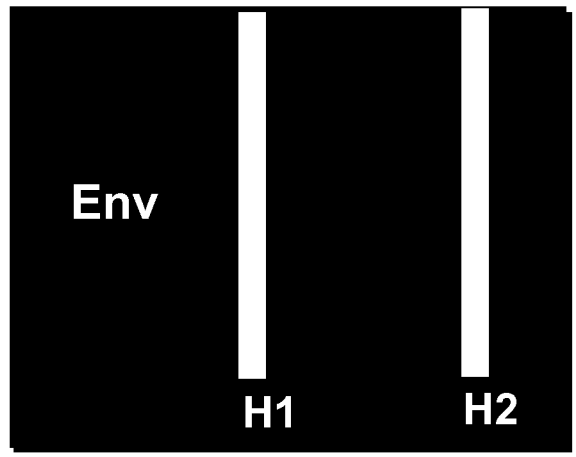
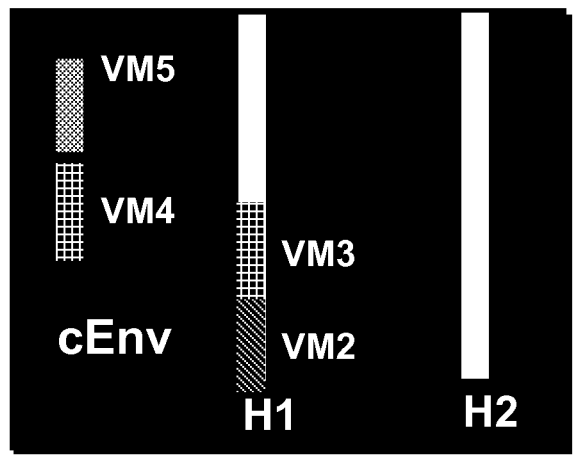
*FIG. 3D(i)*

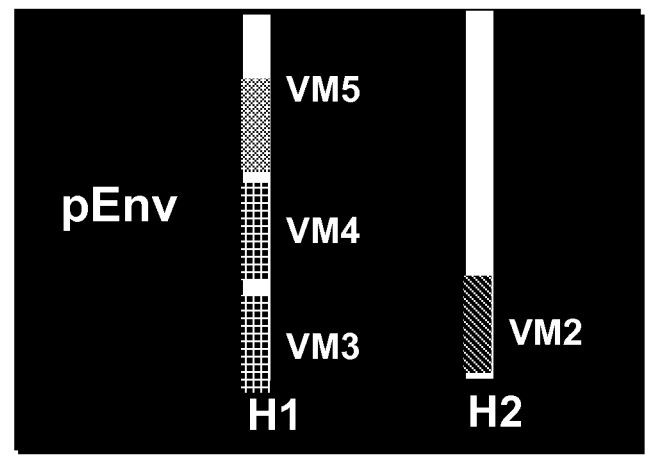
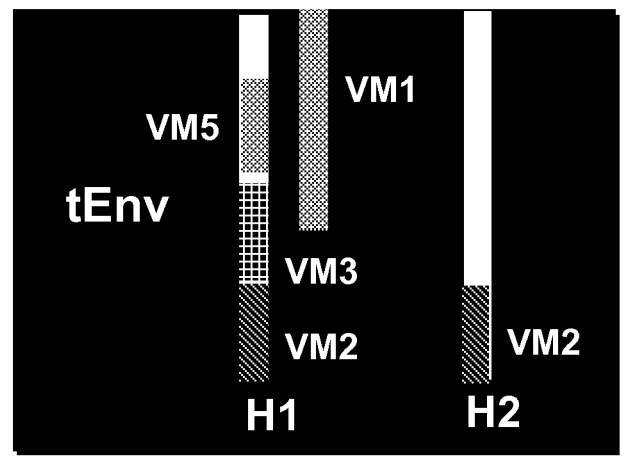
FIG. 3D(ii)

FIG. 3F

| o | v | w | o | w | o | w | w | w | w | w | w | w | w | w | w | w | w |
|---|---|---|---|---|---|---|---|---|---|---|---|---|---|---|---|---|---|
| 1 | 3 | 4 | 5 | 7 | 8 | 9 | 2 | 6 | 10 | 11 | 12 | 13 | 14 | 16 | 22 | 23 | 25 | 26 |

CONCURRENT SCHEDULING OF PLAN OPERATIONS IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the optimized scheduling of plans and their respective operations in a virtualized computing environment.

BACKGROUND

In computing networks, a virtualized environment refers to the collaboration or combination of hardware and software resources and their corresponding functionalities. Network virtualization, typically, involves platform virtualization combined with resource virtualization. Virtual resources are implemented such that the elements or systems that interface with said virtual resources are unaware of the interface requirements for the underlying system components, whether in the form of hardware or software.

Virtualization may be used to help combine multiple physical resources into shared pools. Alternatively, one physical resource can appear as multiple virtual resources. In some computing networks, shared resources are provided to computing systems and other devices connected to the network, on demand, by way of deploying one or more virtual machines (VMs). A VM, generally, runs as a software application to provide a platform-independent programming environment that abstracts away details of the underlying hardware.

VMs may be executed over a hardware resource (i.e., a host machine) to service client requests. A hypervisor is typically implemented by a layer of code in software or firmware and helps implement a VM over the host machine. The hypervisor may be executed in a privileged environment on the host machine and configured to interact with the underlying hardware to enable sharing of resources among one or more VMs.

In some instances, it may be desirable to place or migrate a VM from one location (e.g., a first host) to another location (e.g., a second host) in the virtualized environment to satisfy or improve certain service requests or management goals (such as load balancing or global energy consumption). Management requests get eventually translated into plans of operations where each plan typically specifies a sequential order of execution for the operations, anticipating the successful and safe execution of said operations.

When multiple plans are requested for execution, the environmental resources that support the execution of each plan are to be considered in advance. Otherwise, changes in the execution environment may prevent the successful completion of a planned event or operation. For example, computing a plan (e.g., Plan A) for operations such as VM relocation or deployment may take some time. If another plan (e.g., Plan B) starts execution prior to the execution of plan A, and locks a resource that is to be allocated to Plan A, then Plan A may fail.

While sequential plan scheduling is safe (i.e., avoids deadlock situations, etc.), sequential execution generally results in substantial latencies in provisioning the requested services. These latencies contribute to poor user experience and subpar system performance. In addition the more time a plan takes to be executed the bigger are the chances that its goal will lose relevance (even if the plan can be executed successfully). For example, a plan to better load balance a network may still be executable but no longer relevant if many deployments have occurred in between.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for planning the execution of one or more plans in a virtualized computing environment are provided. In one embodiment, the method comprises computing an order for execution for one or more plans, and the corresponding operations in said one or more plans; validating whether a plan and the corresponding operations for the plan may be successfully executed, prior to executing the plan and the corresponding operations; executing the plan and the corresponding operations, in response to a successful validation; and aborting execution of the plan and the corresponding operations, in response to an unsuccessful validation, wherein the validating process takes into consideration impact of other plans that are previously validated and possible changes in the computing environment since time the plan was computed.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIG. 1 illustrates an exemplary network environment in accordance with one or more embodiments, wherein one or more hosts are utilized to run one or more virtual machines.

FIGS. 3C(i), 3C(ii), 3D(i) and 3D(ii) are block diagrams of exemplary execution environments, wherein changes in the execution environment are considered to validate a plan operation, in accordance with one embodiment.

FIG. 3F is an exemplary data structure that may be utilized to plan the concurrent execution of plan operations, in one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Referring to FIG. 1, in accordance with one or more embodiments, exemplary network environment 100 comprises one or more hosts (e.g., hosts 110, 120, 130) and one or more VMs (e.g., VMs X, Y, Z, T, U). As provided in further detail below a scheme may be implemented to compute one or more plans for managing operations associated with one or more VMs on the one or more hosts. As an example, the plan may include a set of operations for placing one or more VMs on certain hosts according to some placement constraints.

In some embodiments, the placement constraints may comprise one or more anti-collocation constraints, anti-location constraints, resource constraints, or other constraints relevant to placement of the VMs on the hosts. An anti-collocation constraint may prohibit a VM from being placed on the same host as another VM (i.e., avoid a first and second VM from being collocated on the same host). An anti-location constraint may prohibit a VM from being placed on a certain host. A resource constraint may indicate that a certain level of a particular resource is to be allocated to a VM, etc.

In certain circumstances, computed plan operations may fail once executed. For example, if the resource constraints for two concurrently executed plans are conflicting, and are not taken into consideration at the time of execution, a plan may fail for lack of sufficient resources or a deadlock may occur such that no further operations may be executed. An exemplary deadlock scenario is illustrated with reference to FIGS. 2A and 2B which represent two executing plans: P1 comprising ordered operations R5, R6, R7 and P2 comprising ordered operations R1, R2, R3, R4. Each octagonal shape represents a host machine. A dark circle represents a VM, and an arrow represents a relocation operation. The arrow starts from the VM which should be relocated and points towards the host where it should be relocated according to the computed plan.

Figure 2A:
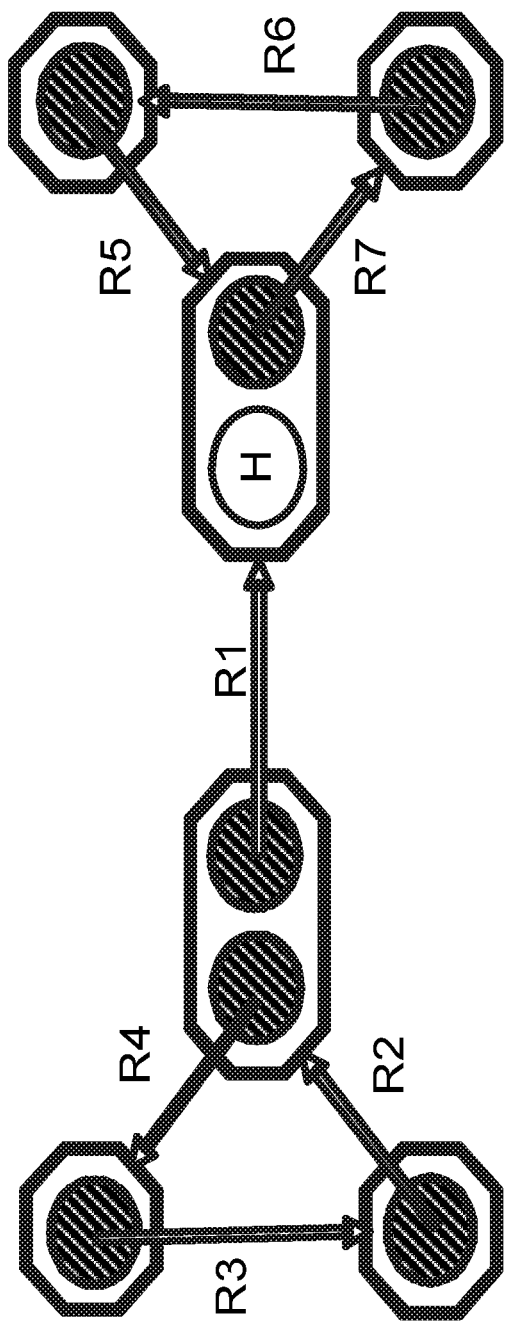
FIGS. 2A and 2B are exemplary block diagrams of a plan of migration in a virtualized environment which may lead to a deadlock.
Figure 2B:
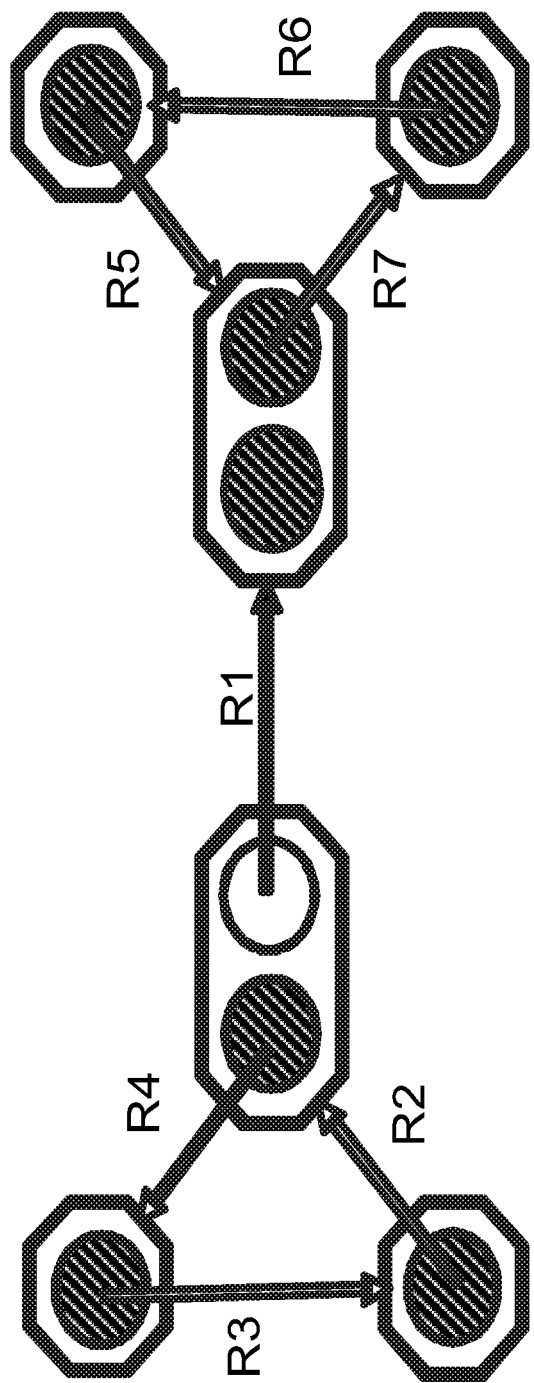

The circle with letter "H" represents a vacant resource space in the designated host. For simplicity, in this example, it is assumed that the VMs consume the same amount of resources and that vacant space is sufficient for accommodating a single VM. Thus, as shown in FIG. 2A, two relocations operations are possible: R1 and R5. If the R1 operation which pertains to P2 is executed first (see FIG. 2B), operations R2, R3 and R4 of P1 may be executed next. However, other planned operations R5, R6 and R7 are deadlocked, as shown, because none of the remaining VMs may be relocated without overloading the target host and thus breaking capacity constraints.

In accordance with one embodiment, to optimize the operation time involved in computing and executing several plans with limited risk of failure, systems and methods are provided to compute and validate a plan prior to execution. During execution, the plan operations that may be executed in parallel without conflict are determined and are desirably run in separate execution threads, taking into consideration operational and resource dependencies as provided in further detail below.

Figure 3A:
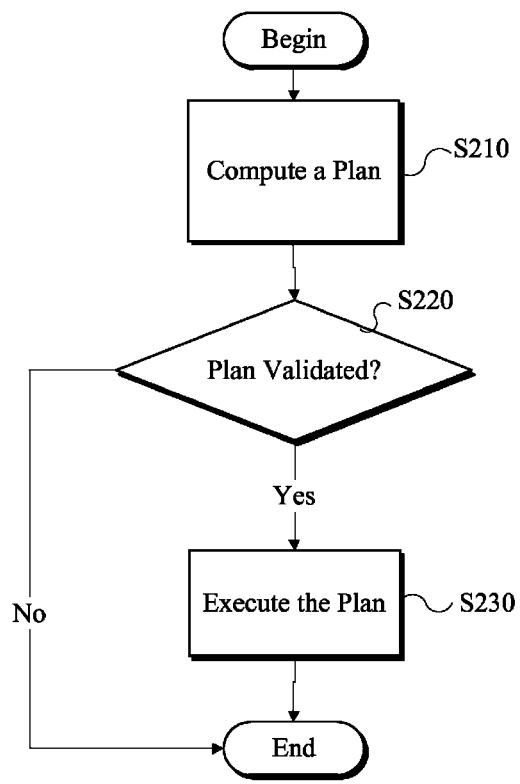
FIG. 3A is a flow diagram of an exemplary method for optimizing the execution of one or more plans in accordance with one embodiment.

Referring to FIG. 3A, a plan may be computed to perform one or more operations (S210). For example, a plan may include a series of deployment and migration steps to achieve a certain goal. At the plan computing stage, constraints such as anti-colocation and VM resources may be taken into account. The exact details related to the availability of resources or the operational constraints associated with the current execution environment (e.g., network bandwidth, storage space, etc.) may or may not be considered. For example, the plan may be computed based on one or more logical constraints (e.g., anti-collocation, anti-location constraints, etc.) at the computation stage.

Depending on implementation, the number or type of constraints that may be considered or skipped at the plan computing stage may be dynamically determined and may vary depending on the management goals or system environment. For example, if it is determined that certain constraint categories are highly volatile in nature (e.g., network bandwidth or shared storage capacity may change dramatically as the system moves from plan computation stage to plan execution stage), and such constraints do not block the successful execution of an operation, or influence an operation's execution speed, then it may be more prudent for said constraints to be taken into account at the execution stage.

Referring back to FIG. 3A, after the plan is computed, the plan is scheduled for execution. The computing stage may take a certain amount of time and also a computed plan may not be requested for execution immediately. The execution environment may change between the computation of the plan and its requested or scheduled execution time. As such, the plan may no longer be valid as the result of the change in the environment. Therefore, prior to starting to execute the plan, the plan is validated (S220). If between the time the plan was computed and the time of validation of the plan, the environment or system resources have not changed to a point to render the execution of the plan moot or unsuccessful, then the plan is validated, and the plan operations are executed (S230). Otherwise, the plan is deemed invalid and is rejected. Depending on implementation the plan may be recomputed possibly yielding either a new order for the set of operations or modifying the set of operations pertaining to the plan, in an instance when it is discovered that some operations of the plan have already been executed by other plans.

Accordingly, if the plan is validated, then the plan and the respective plan operations are sent for execution to the extent that the plans being executed may be completed. This goal can be reached if the plan operations are executed according to the execution order specified in the validated plans). In this manner, the risk for deadlocks and non-compliance with the designated constraints is eliminated or reduced. In one embodiment, it is dynamically determined whether plan operation may be scheduled in advance of their planned order. Such operation scheduling scheme has the potential to introduce a deadlock situation. A method is provided, however, to avoid such deadlock following the reordering of the operations. In the following, further details associated with the validation and execution phases are provided, in accordance with one or more embodiments.

Figure 3B:
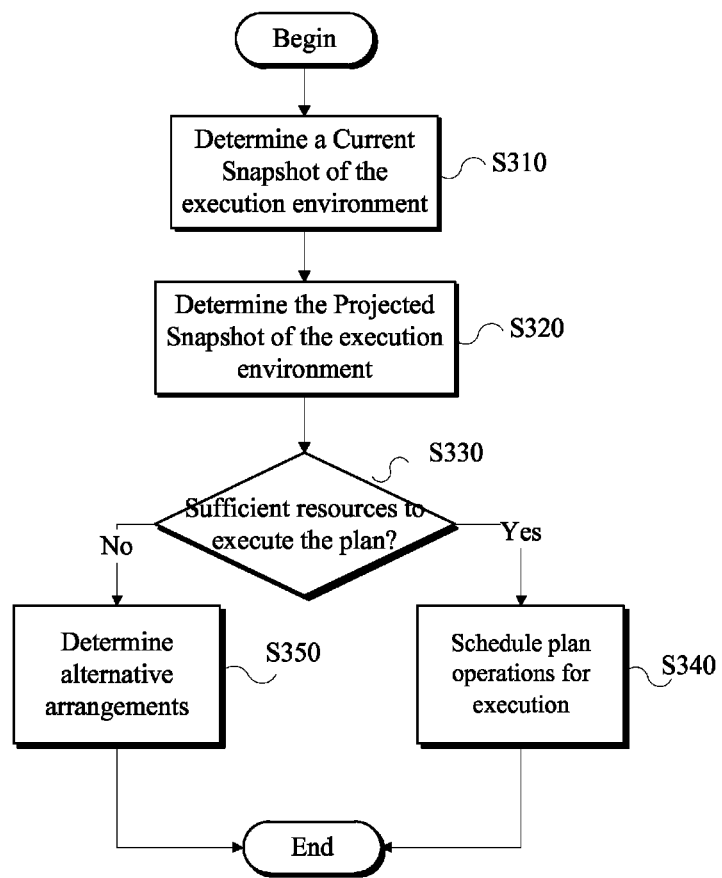
FIG. 3B is a flow diagram of an exemplary validation method in accordance with one embodiment.

Referring to FIG. 3B, an exemplary validation method is disclosed. As noted earlier, at the validation phase, the goal is to determine whether the execution environment has changed since the time the plan was computed or will change because of operations pertaining to validated plans which are still to complete execution. For example, besides the computed plan (i.e., the target plan), other plans may have started execution since the time of computation of the target plan, or other plans may have been validated since. Accordingly, to validate the target plan the following processes are implemented.

In one embodiment, a snapshot of the currently executing environment (cEnv) is taken (S310). The current snapshot may include the status of the resources used by the operations of the plans that have been validated and which have completed their execution. Depending on implementation, the current snapshot may not include the status of the operations pertaining to plans that have been validated but which have not started or completed executing yet. Since the target plan may be scheduled to start executing after the execution of these other plans, the projected status of the execution environment taking into consideration previously validated plans is to be also considered.

A projected snapshot of the execution environment may be calculated (S320), for example, considering the constraints associated with the operations pertaining to validated plans which did not complete. In other words, it is determined what the status of the current environment would be if the currently running and previously validated plans are executed. In this manner, the projected execution environment (pEnv) is determined. It is then determined whether sufficient resources exists in the projected environment to satisfy the constraints associated with the target plan, if that plan is executed (S330). If so, the target plan and the respective planned operations are scheduled to be executed (S340), else an alternative arrangement is determined (S350). The alternate arrangement may require the plan to be recomputed, for example.

Referring to FIG. 3C(i), for example, a scenario is illustrated in which an operation environment (Env) comprises two hosts H1 and H2 with capacities C1 and C2, for example. For simplicity, the capacities of the hosts and the requirements of the VMs address a single resource (such as CPU). According to a plan computed at time T1 and for which the environment is represented as "Env", a VM1 may be computed to be placed on H1 reserving 60% of C1. As shown, at the time T1, the snapshot of Env indicates that H1 has sufficient resources to satisfy the computed plan.

Once the plan for placing VM1 is validated at time T2, however, the snapshot of the current environment (cEnv) reveals that between the time T1 and T2 two other VMs (i.e., VM2 and VM3) were placed on H1, each reserving 20% of C1 for a total of 40% of C1. A projected environment (pEnv) for H1 that takes into account the various operations that were validated prior to T2 but not completed and thus not reflected into cEnv.

In the case depicted by FIG. 3C(ii), pEnv reflects that VM2 was relocated from H1 towards H2 and also that VM4 was added to H1, resulting into H1 being populated (in pEnv) with VM3 and VM4. Taking pEnv as a basis, the target placement (tEnv) reflects the execution of the plan. The constrains associated with VM1, VM3 and VM4 are determined. As shown, despite of the additional VM placements, H1 can still satisfy the plan constraints (i.e., C1 is big enough to accommodate VM1, VM3 and VM4). Thus, the plan for placing VM1 on H1 is validated.

Referring to FIGS. 3D(i) and 3D(ii), another example is illustrated in which H1 cannot accommodate the requirements for VM1 at the time of validation of the plan. In this example, the plan was computed with VM1 having reserved 80% of C1 at the time T1 (i.e., when VM1 plan of placement was computed). As shown, since VM3, VM4 and VM5 have an accumulated projected use of more than 20% of C1, at time T2, not enough of C1 remains available for use by VM1. As such, tEnv indicates that H1 cannot provide the initially computed resource, and therefore the placement plan fails to validate.

Presuming that a plan is validated and scheduled for execution, the execution of the individual operations in the plan may be instrumented. In general, the following serial execution scheme insures the safe and successful execution of multiple plans: (1) plans are executed serially following their order of validation; (2) within a given plan, operations follow the order specified initially in the plan. This non-concurrent execution planning typically results in poor execution times because the various operations are executed serially.

The instrumentation of the individual operations for a plan may involve the analysis of the operations and the dependencies or interdependencies of an operation with other operations in the same plan or other plans. Said analysis is performed in an effort to determine whether two or more operations may be scheduled to run concurrently possibly infringing the ordering mentioned above but without the chance of producing a deadlock. This scheduling builds on the fact that as operations get scheduled and get completed more information is available about which set of validated operations are still to be executed. As noted earlier, the concurrent execution of the operations (as opposed to their serial execution) helps expedite the execution of the plans as a whole.

Figure 3E:
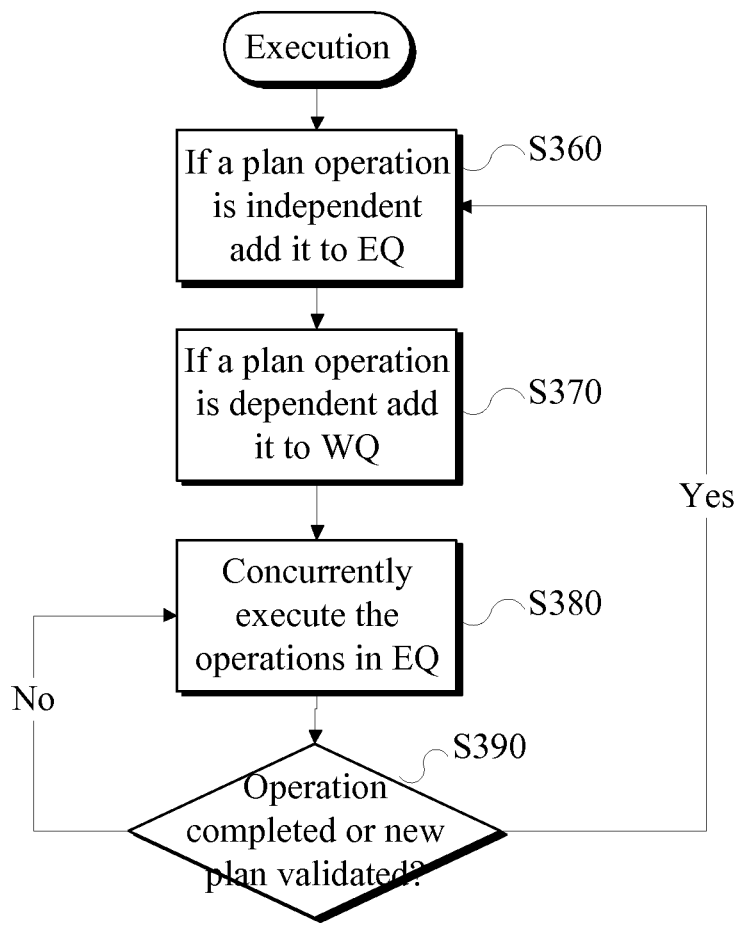
FIG. 3E is a flow diagram of an exemplary method for concurrently scheduling the execution of one or more plan operations in accordance with one embodiment.

Referring to FIG. 3E, in the execution phase, a method for scheduling the execution of the operations in a single plan is illustrated. As provided in further detail below, the method illustrated in FIG. 3E may be modified and expanded to schedule the concurrent execution of operations in a plurality of plans. In one embodiment, the operations which compose a validated plan are appended to the dependency graph. To determine whether an operation in the dependency graph may be executed concurrently (i.e., in parallel) with other operations, it is determined if said operation is independent.

A second operation is deemed to be dependent on the completion of a first operation, if for example the resources used by the first operation are needed to be available for the successful completion of the second operation. As such, if an operation does not need to wait for another operation in the dependency graph to complete execution, then that operation is deemed to be independent. If a plan operation is determined to be independent, then that operation is added to an execution set (EQ) (S360).

On the other hand, if it is determined that an operation is dependent on one or more other operations, that means that said operation may need to wait for the other operations to be completed before it is added to the EQ. As such, if a plan operation is deemed to be dependent, then that operation is added to a wait dependency graph (WQ) (S370). The processes disclosed in S360 and S370 may be applied to every operation for a validated plan, until every operation in the plan is either added to EQ or WQ. Once one or more independent operations are added to the EQ, the operations in the EQ are concurrently executed (S380).

Once an operation in EQ is completed, the operations in WQ are examined; and those operations in WQ that have an independent status after the completion of the operation in EQ are added from WQ to EQ (see S390, and reverting back to S360). The following exemplary algorithm may be used to generally summarize the method illustrated in FIG. 3E, in accordance with one exemplary embodiment:

---

For i=0 to n, for operations $O_i$ where n is the number of operations in a plan:
    i:=i+1
    if $O_i$ is not dependent on the completion of another operation in the plan,
        then add $O_i$ to EQ,
        else add $O_i$ to WQ;
Concurrently execute the operations in EQ;
If an operation $O_x$ in EQ is completed, add operations in WQ that are not dependent on the completion of $O_x$ or another operation in WQ to EQ.

---

The above example algorithm may be further improved as further detailed to schedule operations placed in WQ. The above example algorithm may be also expanded to cover the concurrent scheduling of operations when multiple plans are to be executed concurrently. Referring to FIG. 3E, in such a scenario, if a new plan is validated (S390), the operations of the new plan may be added to WQ and the algorithm may revert to S360 to add those operations that are independent to EQ, and so on. In other words, when multiple plans have been validated, for example if plan P2 is validated after plan P1, then operations for P2 are added to WQ.

In application, the above algorithm may treat each operation in WQ equally within the context of dependency determination without taking into consideration whether an operation belongs to P1 or P2. This is because once a plan is devised into its set of operations the algorithm is applied at the operation level taking into account the dependency among the operations. The dependencies for an operation of a latest validated plan may be computed by taking into consideration the operations of the previous validated plans as well as the order of its containing plan itself.

Further to the above instrumentations, in one embodiment, when an operation is completed (e.g., when an operation is removed from EQ) or when a plan is validated (e.g., when one or more operations in the validated plan are added to WQ), it is determined if an operation in WQ may be executed independent of the other operations that have been included in the EQ or WQ by, for example, loosening the dependency constraints associated with the execution of the other operations. If so, such operation is added to EQ. In this manner, the initial intra and inter orderings of the plans which in general represent a set of sufficient conditions for successful execution of the plans may be loosened at execution time taking into account, as further detailed, that part of the operations may already have finished and also testing if a more aggressive ordering is safe, that is not endangering the chances of successful execution of validated plans.

The above-referenced instrumentations of the execution environment, using one set and one graph, are provided by way of example. It is noteworthy that instead of the above exemplary data structures, other methods, mechanisms or data structures may be utilized to distinguish between operations that are to be concurrently executed or those that are to wait. In some embodiments, a flag, a bit or other identifying mechanism may be used to indicate the wait status for an operation. As an example, see FIG. 3F, wherein operations in a plan are listed in serial in an array structure with flags 'o' and 'w' respectively indicating that an operation may be executed or wait to be executed. Flag 'v' in this example indicates that an operation has completed execution.

In the example shown in FIG. 3F, three sets of operations are scheduled for execution, for example. These three sets of operations may be part of a single plan (e.g., plan A may have operations 1-26) or the operations may be part of multiple plans (e.g., plan A may have operations 1-7, plan B may have operations 8-14, etc.). As shown, the first operation (i.e., Op1) is scheduled for execution, if it does not depend on any other operation Op3 is then tested to see if it may be scheduled to run concurrently with Op1.

Assuming that Op3 is not dependent on Op1 and does not use any resources that are to be locked by Op1, then Op3 may be scheduled to run concurrently with Op1. Op4 is then tested. Assume that, in this example, Op4 may not run concurrently with both Op1 and Op3 and thus Op4 needs to wait. Op5 is then tested. Assume that Op5 may run concurrently with Op1 and Op3. We test whether intermediary operations, such as Op4 in this example, could be executed upon completion of Op1 and Op3 and Op5. If this is the case, then Op5 can be scheduled for concurrent execution.

In the above example, further assume that Op3 is completed. We check for an operation which was blocked by Op3 whether (1) that operation may be run concurrently with the set of running operations, and (2) whether upon the operations completion (along with the other running operations) the intermediary operations may be executed. If so, the checked operation may join the concurrently running operations, otherwise it will remain in waiting status.

For example, in the above scenario, upon Op3 completion, it is determined whether Op4 may run concurrently with Op1 and Op5. If so, the Op4 will be concurrently executed. It is then determined if Op7 may run concurrently with the updated set of running operations, and so on to Op8, Op9, etc.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
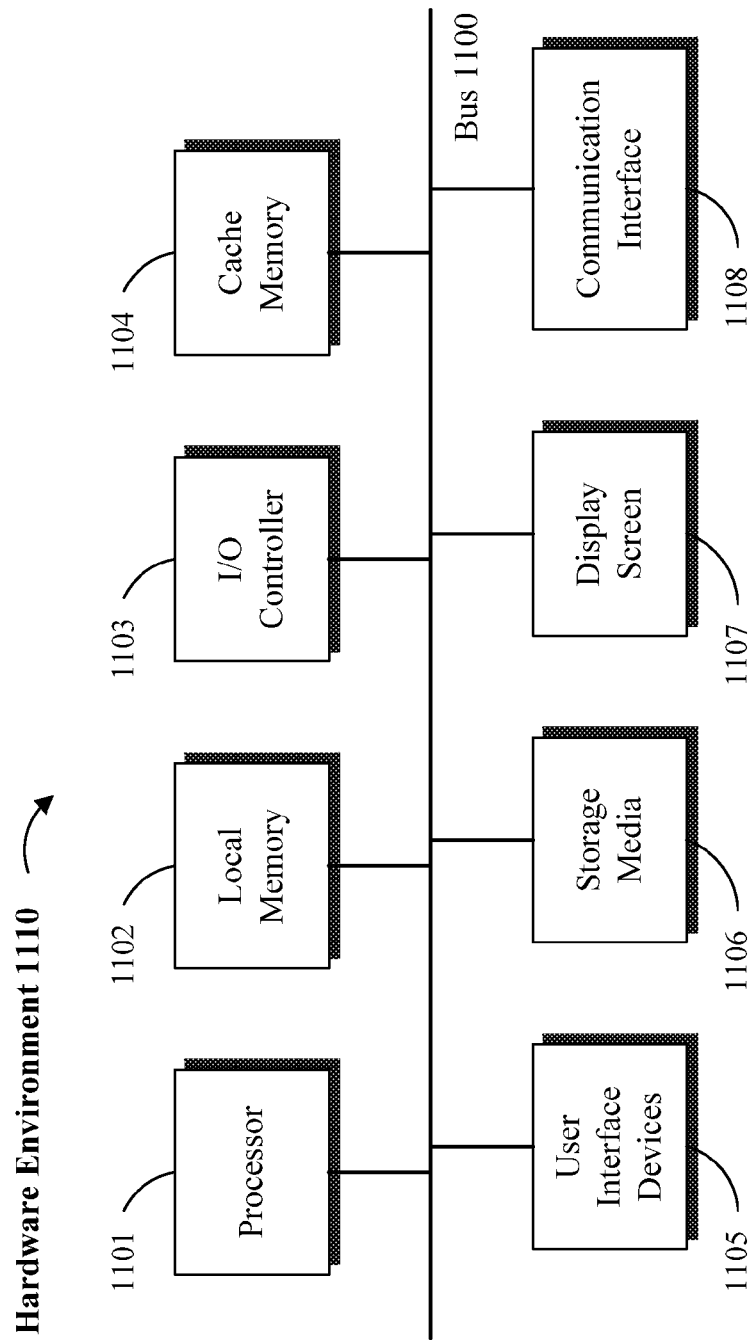
FIGS. 4A and 4B are block diagrams of hardware and software environments in which the disclosed systems and methods may operate, in accordance with one or more embodiments.
Figure 4B:
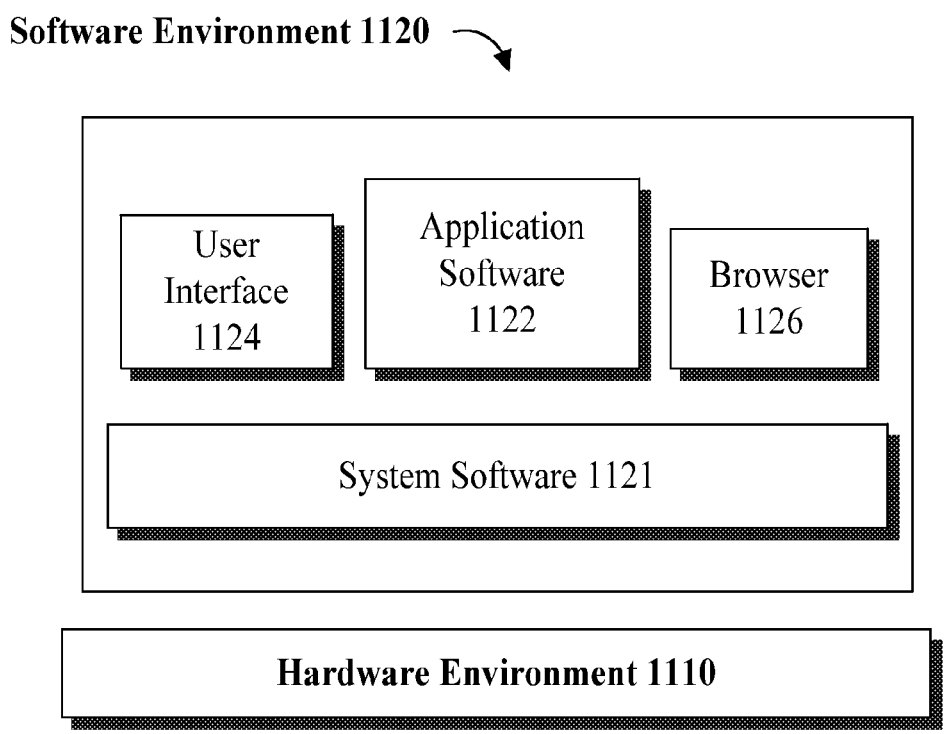

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable storage medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

In some embodiments, the disclosed subject matter may be implemented in a cloud computing environment as provided in further detail below. It is noteworthy that the claimed subject matter shall not be construed to be limited to a cloud computing environment. Rather, different embodiments may be implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, VMs, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment Models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 5A:
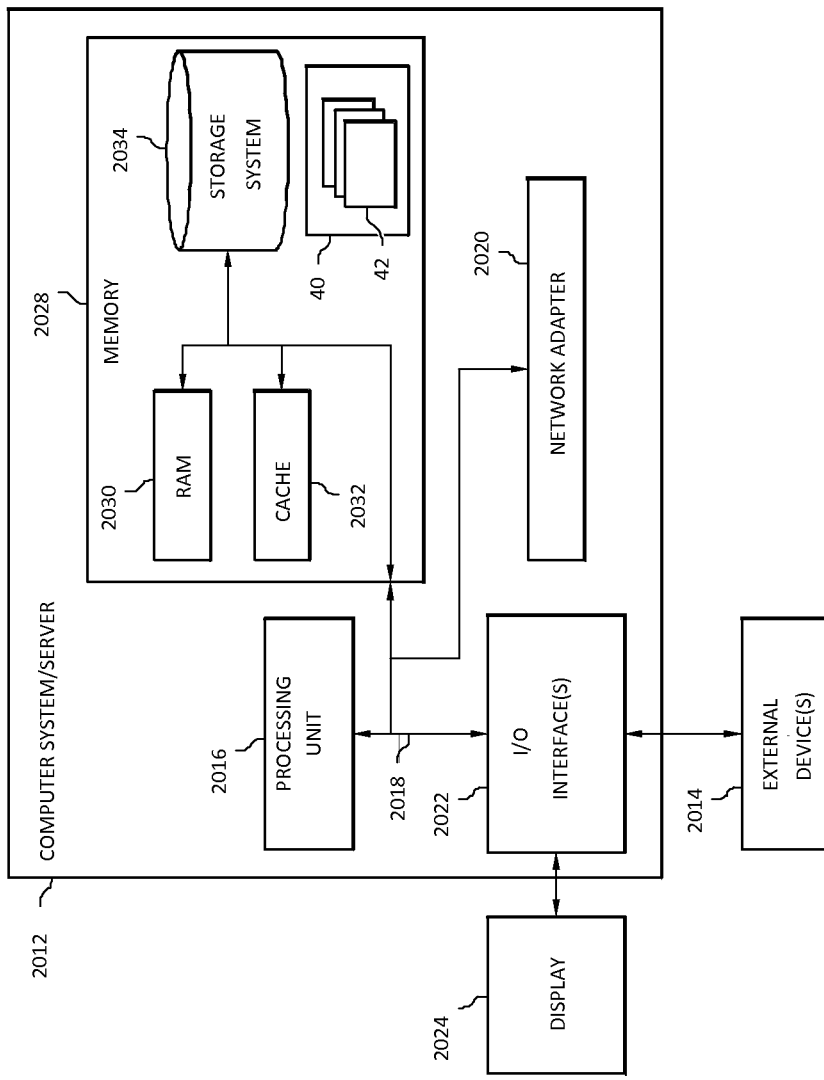
FIG. 5A depicts a cloud computing node according to one embodiment.

A cloud computing environment is service oriented with a focus on statelessness, low coupling, modularity, and semantic interoperability. At the heart of cloud computing is an infrastructure comprising a network of interconnected nodes. Referring now to FIG. 5A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 5B:
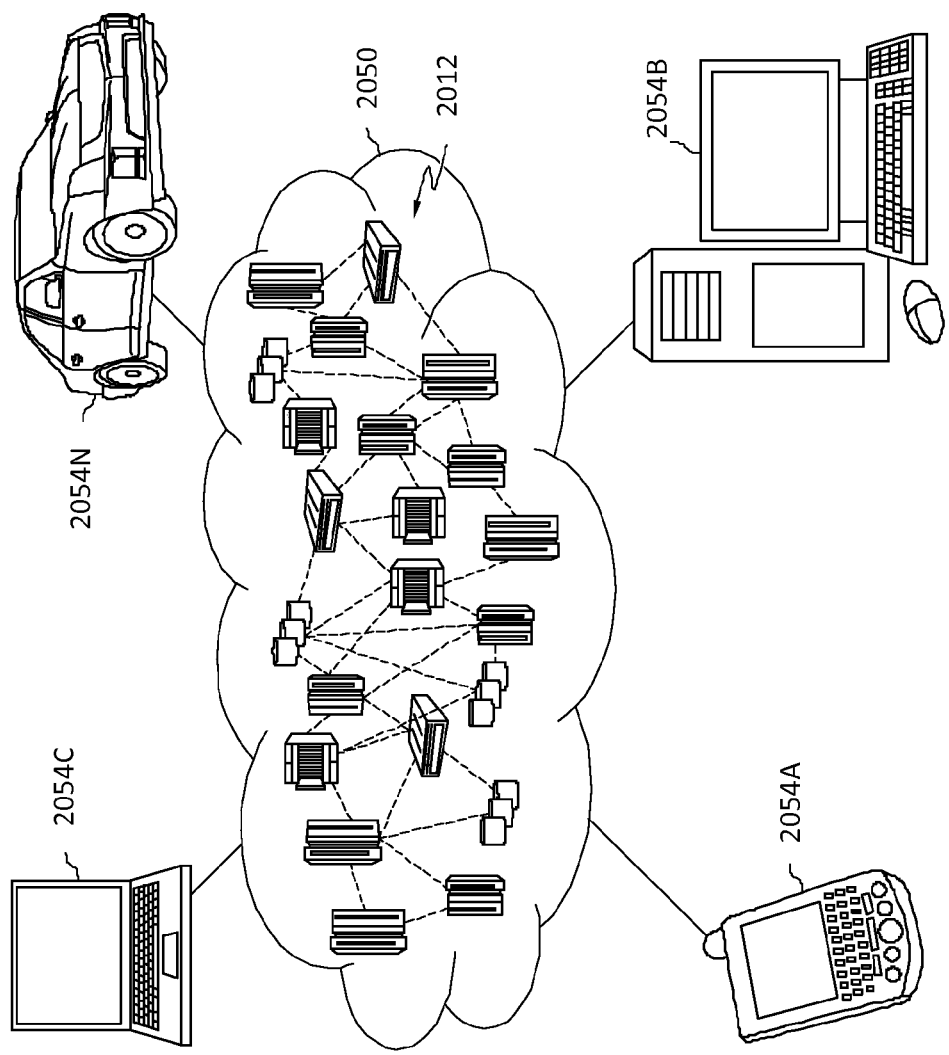
FIG. 5B depicts a cloud computing environment according to one embodiment.

Referring now to FIG. 5B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 5B are intended to be illustrative only and that computing nodes 2010 and cloud computing environment 2050 may communicate with any type of computerized device over any type of network and/or network addressable connection (e.g., using a web browser).

Figure 5C:
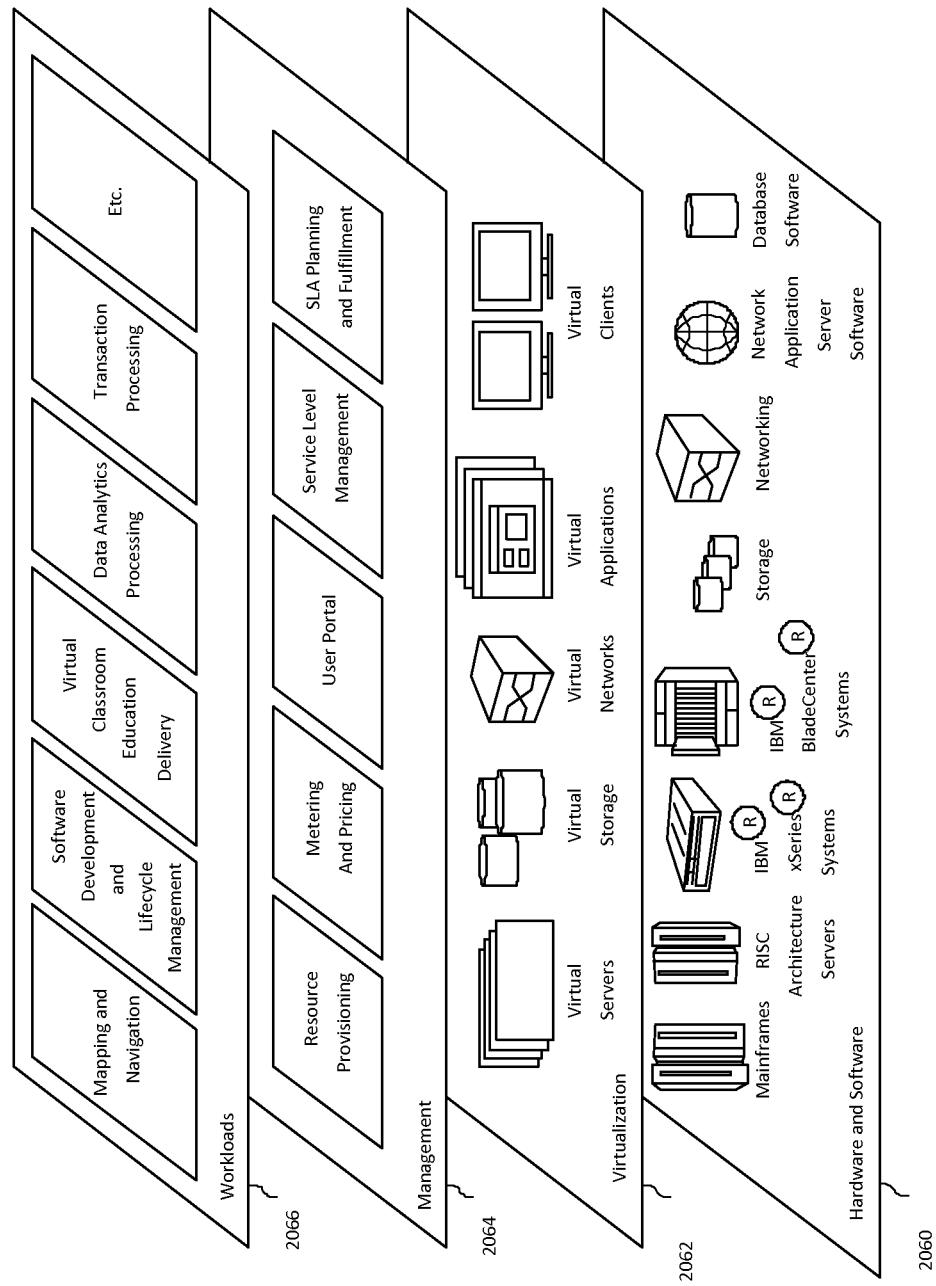
FIG. 5C depicts abstraction model layers according to one embodiment.

Referring now to FIG. 5C, a set of functional abstraction layers provided by cloud computing environment 2050 (FIG. 5B) is shown. It should be understood in advance that the components, layers, and functions shown in FIG. 5C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for planning execution of one or more plans in a virtualized computing environment, the method comprising:

computing, using one or more processors, an order for execution for one or more plans, wherein a plan involves the execution of at least one operation associated with the plan, wherein the one or more plans are associated with migration or deployment of one or more virtual machines in a distributed computing network, such that the migration or deployment of the one or more virtual machines requires allocation of one or more resources in at least one destination host to which a virtual machine is migrated;

after computing an order of execution for a first plan of the one or more plans and prior to scheduling the first plan for execution, validating whether the first plan and the corresponding operations for the first plan will be successfully executed by:

determining a current resource allocation status of the virtualized computing environment and a projected resource allocation status of the virtualized computing environment, wherein the current resource allocation status provides information about resources already allocated to one or more plans that either completed execution or are executing at a time of validation, wherein the projected resource allocation status provides information about resources that are to be allocated to one or more plans that are validated and either have not started or have not completed execution at a time of validation;

wherein the determining of the current resource allocation status and the projected resource allocation status includes determining whether resources will be available in the respective resource allocation statuses for the virtualized computing environment to support execution of the first plan and corresponding operations of the first plan, and wherein the validating takes into consideration an impact of other plans that are previously validated and possible changes in the virtualized computing environment since a time when the order of execution of the first plan was computed;

dividing corresponding operations for a validated first plan and a validated second plan scheduled for execution into an execution set and an operation dependency graph, wherein operations that are not dependent on other operations are grouped into the execution set, and operations that are dependent on other operations are grouped into the operation dependency graph; and concurrently executing the operations in the execution set, while delaying execution of a first operation in the operation dependency graph until all operations on which the first operation depends are completed.

2. The method of claim 1, wherein the first plan is validated when one or more resources are available.

3. The method of claim 1, wherein an alternative plan is computed when one or more resources are not available.

4. The method of claim 1 further comprising:

adding the first operation in the operation dependency graph to the execution set, in response to determining that a particular operation in the execution set has completed execution and that the first operation in the operation dependency graph is no longer dependent on the other operations, wherein the first operation is dependent on completion of the particular operation.

5. The method of claim 1, further comprising:

grouping corresponding operations for a validated third plan scheduled for execution into the execution set and operation dependency graph, wherein operations that are not dependent on other operations are grouped into the execution set, and operations that are dependent on other operations are grouped into the operation dependency graph.

6. A system for planning execution of one or more plans in a virtualized computing environment, the system comprising:

a logic unit for computing an order for execution for one or more plans, wherein a plan involves the execution of at least one operation associated with the plan, wherein the one or more plans are associated with migration or deployment of one or more virtual machines in a distributed computing network, such that the migration or deployment of the one or more virtual machines requires allocation of one or more resources in at least one destination host to which a virtual machine is migrated;

a logic unit for validating whether a first plan of the one or more plans and the corresponding operations for the first plan will be successfully executed by:

determining a current resource allocation status of the virtualized computing environment and a projected resource allocation status of the virtualized computing environment, wherein the current resource allocation status provides information about resources already allocated to one or more plans that either completed execution or are executing at a time of validation, wherein the projected resource allocation status provides information about resources that are to be allocated to one or more plans that are validated and either have not started or have not completed execution at a time of validation;

wherein the determining of the current resource allocation status and the projected resource allocation status includes determining whether resources will be available in the respective resource allocation statuses for the virtualized computing environment to support execution of the first plan and corresponding operations of the first plan, and wherein the validating takes into consideration an impact of other plans that are previously validated and possible changes in the virtualized computing environment since a time when an order of execution of the first plan was computed;

a logic unit for dividing corresponding operations for a validated first plan and a validated second plan scheduled for execution into an execution set and an operation dependency graph, wherein operations that are not dependent on other operations are grouped into the execution set, and operations that are dependent on other operations are grouped into the operation dependency graph; and a logic unit for concurrently executing the operations in the execution set, while delaying execution of a first operation in the operation dependency graph until all operations on which the first operation depends are completed.

7. The system of claim 6, further comprising adding the first operation in the operation dependency graph to the execution set, in response to determining that a particular operation in the execution set has completed execution and that the first operation in the operation dependency graph is no longer dependent on the other operations, wherein the first operation is dependent on completion of the particular operation.

8. The system of claim 6, further comprising grouping corresponding operations for a validated third plan scheduled for execution into the execution set and operation dependency graph, wherein operations that are not dependent on other operations are grouped into the execution set, and operations that are dependent on other operations are grouped into the operation dependency graph.

9. The system of claim 6, wherein the first plan is validated when one or more resources are available.

10. The system of claim 6, wherein an alternative plan is computed when one or more resources are not available.

11. A computer program product comprising a non-transitory computer readable storage medium having a computer readable program, wherein the computer readable program when executed on a computer causes the computer to:

compute an order for execution for one or more plans, wherein a plan involves the execution of at least one operation associated with the plan, wherein the one or more plans are associated with migration or deployment of one or more virtual machines in a distributed computing network, such that the migration or deployment of the one or more virtual machines requires allocation of one or more resources in at least one destination host to which a virtual machine is migrated;

validate whether a first plan of the one or more plans and the corresponding operations for the first plan will be successfully executed by:

determining a current resource allocation status of the virtualized computing environment and a projected resource allocation status of the virtualized computing environment, wherein the current resource allocation status provides information about resources already allocated to one or more plans that either completed execution or are executing at a time of validation, wherein the projected resource allocation status provides information about resources that are to be allocated to one or more plans that are validated and either have not started or have not completed execution at a time of validation;

wherein the determining of the current resource allocation status and the projected resource allocation status includes determining whether resources will be available in the respective resource allocation statuses for the virtualized computing environment to support execution of the first plan and corresponding operations of the first plan, and wherein the validating takes into consideration an impact of other plans that are previously validated and possible changes in the virtualized computing environment since a time when the order of execution of the first plan was computed;

divide corresponding operations for a validated first plan and a validated second plan scheduled for execution into an execution set and an operation dependency graph, wherein operations that are not dependent on other operations are grouped into the execution set, and operations that are dependent on other operations are grouped into the operation dependency graph; and concurrently execute the operations in the execution set, while delaying execution of a first operation in the operation dependency graph until all operations on which the first operation depends are completed.

12. The computer program product of claim 11, further comprising adding the first operation in the operation dependency graph to the execution set, in response to determining that a particular operation in the execution set has completed execution and that the first operation in the operation dependency graph is no longer dependent on the other operations, wherein the first operation is dependent on completion of the particular operation.

13. The computer program product of claim 11, further comprising grouping corresponding operations for a validated third plan scheduled for execution into the execution set and operation dependency graph, wherein operations that are not dependent on other operations are grouped into the execution set, and operations that are dependent on other operations are grouped into the operation dependency graph.

14. The computer program product of claim 11, wherein the first plan is validated when one or more resources are available.

15. The computer program product of claim 11, wherein an alternative plan is computed when one or more resources are not available.

* * * * *